US007152076B2

(12) United States Patent
Sundararajan et al.

(10) Patent No.: US 7,152,076 B2
(45) Date of Patent: Dec. 19, 2006

(54) SYSTEM AND METHOD FOR EFFICIENT MULTI-MASTER REPLICATION

(75) Inventors: Naresh Sundararajan, Redmond, WA (US); Charumathy Narayanan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 737 days.

(21) Appl. No.: 10/350,236

(22) Filed: Jan. 23, 2003

(65) Prior Publication Data

US 2004/0148317 A1   Jul. 29, 2004

(51) Int. Cl.
*G06F 17/30* (2006.01)
(52) U.S. Cl. .................................. 707/203; 201/204
(58) Field of Classification Search ........ 707/200–205, 707/10
See application file for complete search history.

(56) References Cited

U.S. PATENT DOCUMENTS

| | | | |
|---|---|---|---|
| 5,651,517 A * | 7/1997 | Stevens et al. ............. 246/2 R |
| 5,706,509 A * | 1/1998 | Man-Hak Tso ............. 707/201 |
| 6,202,085 B1 * | 3/2001 | Benson et al. ............. 709/205 |
| 6,466,950 B1 * | 10/2002 | Ono ......................... 707/201 |
| 6,487,560 B1 * | 11/2002 | LaRue et al. ............... 707/203 |
| 6,578,069 B1 * | 6/2003 | Hopmann et al. ........... 709/203 |
| 6,615,223 B1 * | 9/2003 | Shih et al. |
| 6,694,335 B1 * | 2/2004 | Hopmann et al. ........... 707/201 |
| 7,003,531 B1 * | 2/2006 | Holenstein et al. ......... 707/201 |
| 2002/0083211 A1 * | 6/2002 | Driesner et al. ............ 709/311 |
| 2003/0182327 A1 * | 9/2003 | Ramanujam et al. ....... 707/204 |
| 2004/0153473 A1 * | 8/2004 | Hutchinson et al. ...... 707/104.1 |

OTHER PUBLICATIONS

Bernstein, P.A. et al., "Concurrency Control in Distributed Database Systems", *Computing Surveys*, 1981, 13(2), 185-221.
Daniels, D. et al., "An Algorithm for Replicated Directories", *ACM*, 1983, 104-113.
Gardarin, G. et al., "A Reliable Distributed Control Algorithm for Updating Replicated Databases", *IEEE*, 1979, 42-51.
Gifford, D.K. et al., "Weighted Voting for Replicated Data", *ACM*, 1979, 150-162.
Thomas, R.H., "A Majority Consensus Approach to Concurrency Control for Multiple Copy Databases", *ACM Transactions on Database Systems*, 1979, 4(2), 180-209.
Wuu, G.T.J. et al., "Efficient Solutions to the Replicated Log and Dictionary Problems", *ACM*, 1984, 233-242.

* cited by examiner

*Primary Examiner*—Debbie Le
(74) *Attorney, Agent, or Firm*—Woodcock Washburn LLP

(57) ABSTRACT

Each replica in a group of replicas of a data set is assigned a unique identifier and maintains an independent counter. When a change is made to an element in the data set, a change bucket, is assigned to the changed data element. The change bucket includes the identifier of the replica at which the change was made and the count of the counter of the replica at which the change was made at the time of the change. Each replica also maintains an array of change buckets each corresponding to the most recent changes replicated from the other replicas in the group. When replicas synchronize, the replicas exchange and compare replication state vectors to identify changes present at a replica and not present at another replica. Once such changes are identified, they and their corresponding change buckets are sent to the other replica to be replicated. Once new changes are replicated, the replicas join their replication state vectors to reflect that they are synchronized.

20 Claims, 4 Drawing Sheets

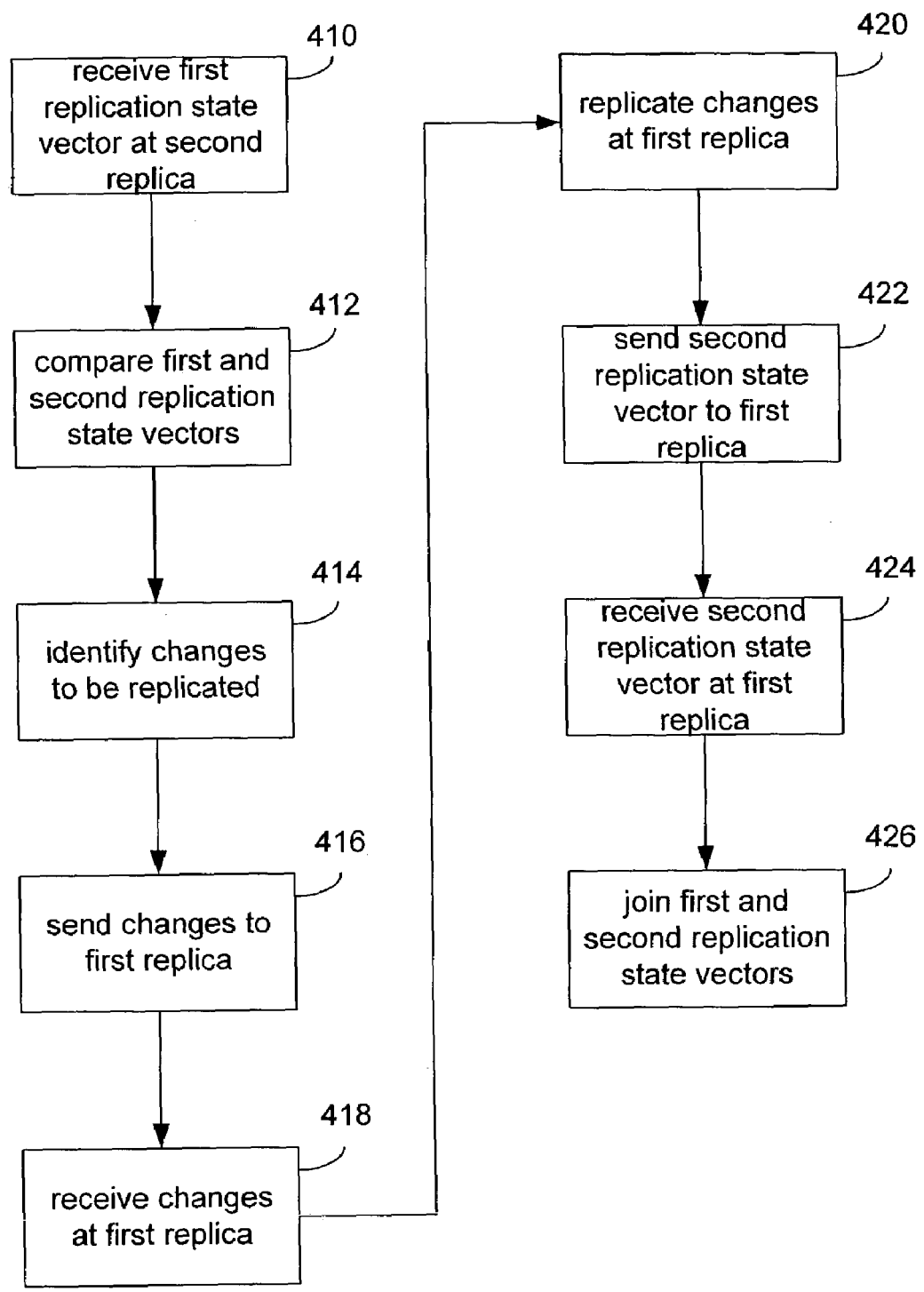

SYSTEM AND METHOD FOR EFFICIENT MULTI-MASTER REPLICATION

BACKGROUND OF THE INVENTION

1. Field of the Invention

The present invention is directed to the field of data replication, and, more specifically, to maintaining coherency between multiple replicas of a data set.

2. Description of the Prior Art

The need to replicate data sets is becoming increasingly important. Server to server data replication provides for greater data redundancy in the case of faults. Server to server replication further provides for increased data availability, increased load balancing, and increased geographic proximity between users and data. Server to client data replication enables access to replicated data on a client device. For example, replicated data may be accessed on a desktop computer at an office or on a portable laptop computer at a remote location. Client to client replication, which may also be referred to as peer to peer replication, enables access to replicated data on multiple client devices. For example, data may be changed on a desktop and replicated on a portable laptop computer at a remote location.

In existing data replication methods, local changes are time stamped at the replica on which they occur. Because physical clocks may not always be accurately synchronized, a logical timestamp rather than a physical timestamp is required. A set of changes that occur in close temporal proximity are assigned a logical timestamp which may be referred to as a "generation." Generations enable ordering of changes at a local replica using a monotonically increasing "local counter". The local counter has no relevance across replicas. The unique identifier associated with a generation enables multiple replicas to compare sets of generations to computer the incremental changes that will be propagated between replicas. For example, rather than being assigned a physical timestamp such as "1:00 A.M.", a change may be assigned a logical timestamp such as "Generation G1 with local counter value 40." Each local change is therefore assigned a logical timestamp. The assignment of logical timestamps enables a replica to request a particular generation or set of generations from another replica.

One limitation of existing data replication is that each individual replica must maintain a list of generations received from other replicas. Specifically, records of each generation with its unique identifier and a locally mapped counter value may be stored in a table. Because data is often replicated over a long period of time, such tables typically require a large quantity of memory to store and are inefficient to propagate across a network. Although such tables may be periodically "pruned" to decrease their size, the pruning operation may result in the deletion of valuable records which will prevent efficient incremental synchronization with replicas which have not recently synchronized, which may be referred to as latent replicas. Thus, there is a need in the art for data replication methods that do not require records of generations and their corresponding local timestamps.

Another limitation of existing data replication methods is redundant transfer of generations between replicas in a dynamic synchronization topology. Such redundant transfer occurs because a replica must inspect a given generation of changes to determine whether or not the changes have already been replicated. Thus, there is a need in the art for data replication methods in which such redundant transfers are unnecessary.

Furthermore, in addition to the desired characteristics set forth above, there is a need in the art for data replication methods that perform effectively in a variety of different environments. Specifically, data replication may be employed in either a single-master or a multi-master environment. In single-master data replication, data elements may be changed only at a single "master" replica, while, in multi-master data replication, data elements may be changed at multiple and possibly all replicas. Additionally, data may be replicated in either a fixed synchronization topology or a dynamic synchronization topology. In a fixed synchronization topology, a particular replica will only synchronize with a fixed set of other replicas, while in a dynamic synchronization topology, all replicas may potentially synchronize dynamically with every other replica. Furthermore, updating of data at multiple replicas may be either strictly serialized or it may occur in both serial and in parallel. Thus, systems and methods for data replication that perform effectively in the environments set forth above are desired.

SUMMARY OF THE INVENTION

Accordingly, systems and methods for efficient replication of a data set are disclosed. A data set is a collection of data such as, for example, a relational data table. The data set includes multiple data elements such as, for example, the rows in a relational data table. The data set is hosted on a group of multiple devices that may be referred to as "replicas". The group of replicas may include multiple servers, a server and its dedicated client devices, or multiple client devices. Each data element in the data set may be periodically changed. A change may be the insertion, modification, or deletion of the data element, for example.

Each replica in the group is assigned a unique identifier, which may be referred to as a replica identifier. Each replica maintains a counter, which may be referred to as a change bucket counter. Such change bucket counters are independent and monotonically increasing. When a change is made, a tuple, which may be referred to as a change bucket, is assigned to the changed data element. The change bucket includes two parameters. The first parameter is the replica identifier of the replica at which the change was made. The second parameter is the count of the change bucket counter of the replica at which the change was made at the time of the change.

To maintain coherency in the data set, the replicas in the group will synchronize with each other. Synchronization may be performed at regular intervals or may be initiated by a command from a user. During synchronization, changes present at one replica and not present at another replica are replicated such that replicas are synchronized. For example, changes present at a first replica and not present at a second replica may be replicated at the second replica and, simultaneously, changes present at the second replica and not present at the first replica may be replicated at the first replica. To identify changes to be replicated, each replica maintains a replication state vector. The vector is an array of change buckets each corresponding to a replica in the group. Each such change bucket includes the replica identifier of its corresponding replica and the count of the change bucket assigned to the highest change replicated from its corresponding replica.

When replicas synchronize, the replicas exchange and compare replication state vectors to identify changes to be replicated. Such changes may be changes made locally at a replica after a previous synchronization or changes replicated from another replica after a previous synchronization.

Once such changes are identified, they and their corresponding change buckets are sent to the other replica to be replicated. Once such changes are replicated, the replicas join their replication state vectors to reflect that they are synchronized.

BRIEF DESCRIPTION OF THE DRAWINGS

The illustrative embodiments will be better understood after reading the following detailed description with reference to the appended drawings, in which:

FIG. 4 is a flowchart of an exemplary synchronization method in accordance with the present invention.

DETAILED DESCRIPTION

Figure 1:
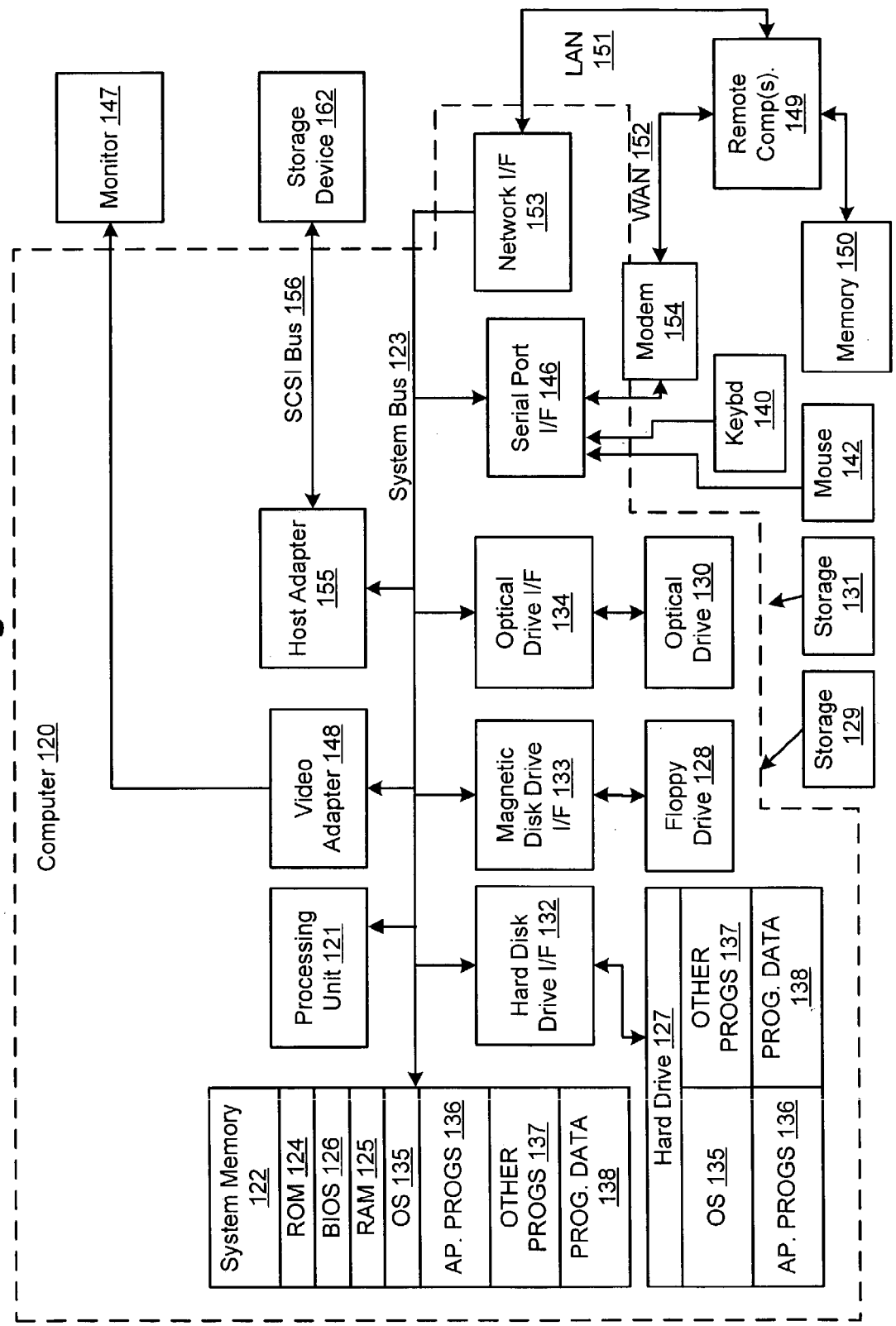
FIG. 1 is a block diagram representing a general purpose computer system in which aspects of the present invention and/or portions thereof may be incorporated.

A system that meets the above-mentioned objects and provides other beneficial features in accordance with the presently preferred exemplary embodiment of the invention will be described below with reference to aforementioned Figures. Those skilled in the art will readily appreciate that the description given herein with respect to those figures is for explanatory purposes only and is not intended in any way to limit the scope of the invention. Throughout the description, like reference numerals will refer to like elements in the respective figures.

Computer Environment

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Exemplary System and Method of the Present Invention

Generally, coherency is maintained within a group of replicas of a data set. A data set is a collection of data such as, for example, a relational data table. The data set includes multiple data elements such as, for example, rows in a relational data table. The data set is hosted on a group of multiple computing devices that may be referred to as "replicas". The data sets on each replica in the group are periodically synchronized. The replicas involved in synchronization replicate differences in changes between them.

Figure 2:
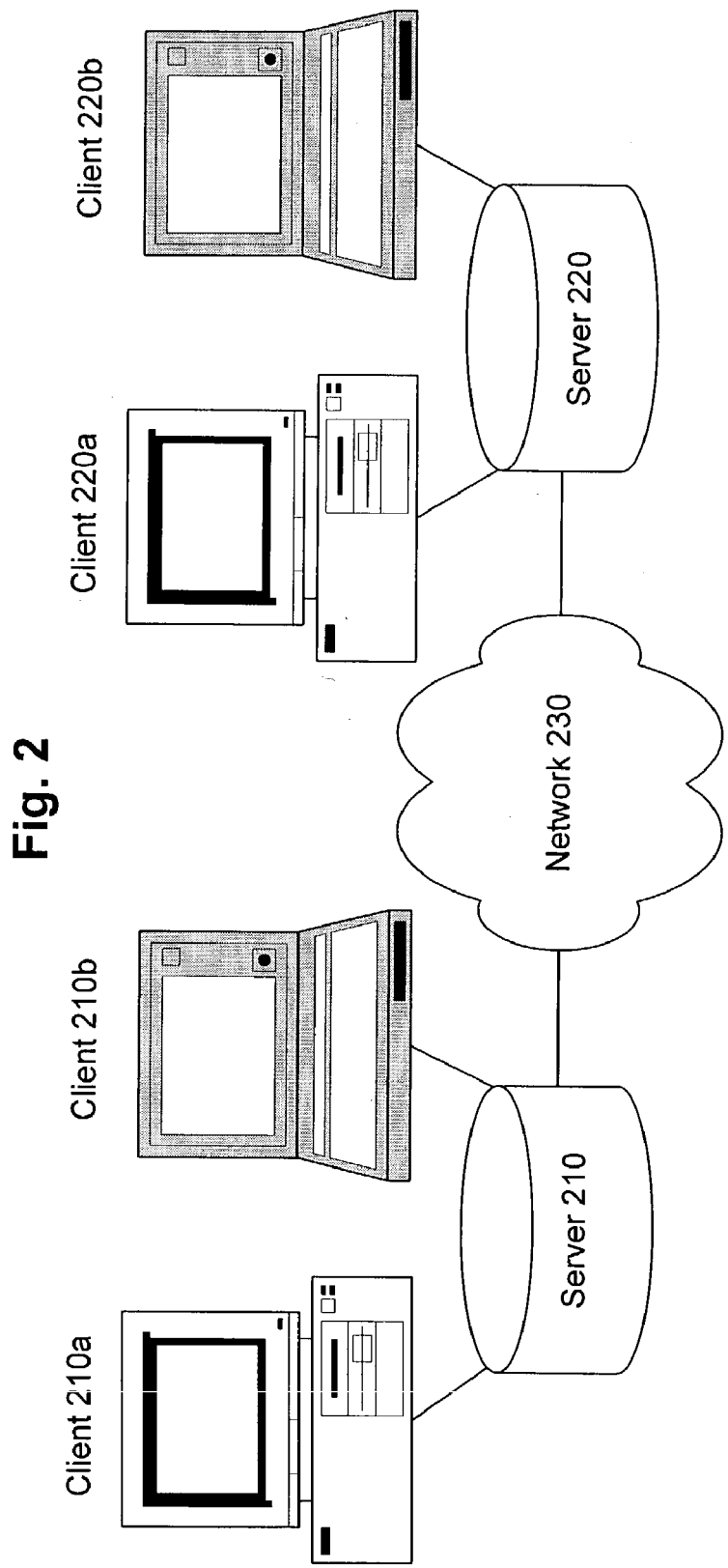
FIG. 2 is a block diagram of an exemplary computer network in accordance with the present invention.

A block diagram of an exemplary computer network in accordance with the present invention is shown in FIG. 2. As shown, servers 210 and 220 are connected via network 230. Network 230 may be a wide area network (WAN) such as, for example, the Internet. Clients 210a,b and 220a,b are connected to servers 210 and 220, respectively. Clients 210a,b and 220a,b may be personal computing devices such as, for example, desktops, laptops, or handheld devices.

The present invention supports "server to server" replication between multiple servers 210 and 220. The present invention further supports server to client replication between a server 210 and 220 and its dedicated clients 210a,b and 220a,b respectively. The present invention further supports peer to peer replication between a group of client devices 210a,b or 220a,b.

Figure 3:
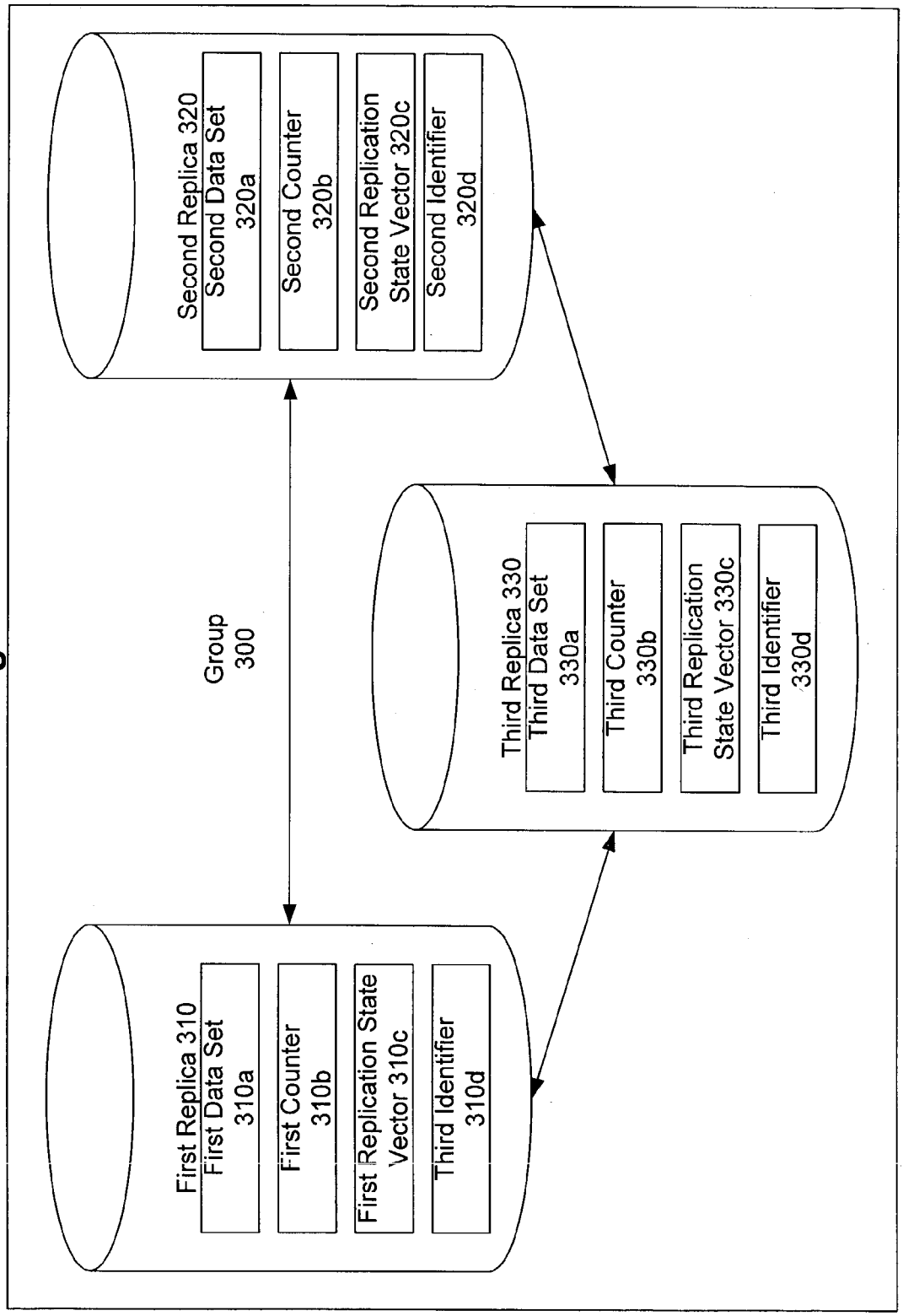
FIG. 3 is a block diagram of an exemplary group of replicas in accordance with the present invention.

A block diagram of an exemplary group of replicas in accordance with the present invention is shown in FIG. 3. As shown, group 300 includes first replica 310, second replica 320, and third replica 330. As should be appreciated replicas 310–330 may comprise, for example, three servers, a server and two dedicated clients, or three clients. As should be further appreciated, group 300 may include any number of other additional replicas (not shown).

Replicas 310–330 each have a data set 310c–330c, a change bucket counter 310b–330b, a replication state vector 310c–330c, and a unique identifier, 310d–330d, respectively. Data sets 310a–330a are preferably synchronized collections of data such as, for example, a table stored in a relational database. Data sets 310a–330a preferably include multiple data elements. The data elements are preferably individual entities in the data set such as, for example, rows in the relational data table. Change bucket counters 310b–330b are preferably monotonically increasing counters. Counters 310b–330b are preferably independent of one another and may be asynchronous. Replication state vectors 310c–330c preferably store metadata corresponding to changes made to elements in data sets 310a–330a. Identifiers 310d–330d identify replicas 310–330 and are preferably Globally Unique Identifiers (GUIDS).

A change to a data element may be made at a replica 310–330 by accessing a data set 310a–330a, for example, through a database management system (DBMS). A change may include the insertion, deletion, or modification of a data element. For example, the data stored in a row of a relational data table may be modified. When a change is made, a corresponding change bucket entry is added to the data element that was changed. If the change was a deletion, the corresponding change bucket entry may be added to a "tombstone" entry. Such a tombstone entry is an entry that records a deleted data element for the purpose of replicating the deletion of the element at other replicas.

The change bucket entry is preferably a tuple having two parameters. The first parameter is the identifier 310d–330d of the replica 310–330 at which the change is made. The second parameter is the count of the counter 310b–330b of the replica 310–330 at which the change is made at the time at which the change is made. An exemplary first data set 310a for first replica 310 is shown below in Table 1:

TABLE 1

| Data Element ID | Change Bucket |
|---|---|
| 1 | (R1, 3) |
| 2 | (R1, 7) |

As shown, each entry in Table 1 corresponds to a data element that was changed at first replica 310 identified by the identifier "R1". Data element 1 was changed locally at first replica 310 when the count of first change bucket counter 310b was 3. Data element 2 was changed after first change bucket counter 310b had increased to 7.

An exemplary second data set 320a for second replica 320 is shown below in Table 2:

TABLE 2

| Data Element ID | Change Bucket |
|---|---|
| 3 | (R2, 10) |
| 4 | (R2, 10) |
| 5 | (R2, 11) |

As shown above, each entry in Table 2 corresponds to a data element that was changed at second replica 320 identified by the identifier "R2". Data Elements 3–4 were changed locally at second replica 320 when the count of second change bucket counter 320b was 10. Data Element 5 was changed after second change bucket counter 320b had increased to 11.

As should be appreciated, although the changes recorded in Table 1 have lower counts than the changes recorded in Table 2, the changes recorded in Table 1 may not necessarily have occurred before the changes in Table 2. For example, although the change bucket count of the change to Data Element 1 in Table 1 is "3" and the change bucket count of the change to Data Element 3 in Table 2 is "10", Data Element 3 in Table 2 may have occurred before Data Element 1 in Table 1. As set forth previously, first change bucket counter 310b and second change bucket counter 320b are preferably independent and may be asynchronous. Thus, the count at second counter 320b may have increased to "10" before the count at first counter 310b increased to "3".

An exemplary third data set 330a for third replica 330 is shown below in Table 1:

TABLE 3

| Data Element ID | Change Bucket |
|---|---|
| 6 | (R3, 5) |
| 7 | (R3, 9) |

As shown, each entry in Table 3 corresponds to a data element that was changed at third replica 330 identified by the identifier "R3". Data element 6 was changed locally at third replica 330 when the count of third change bucket counter 330b was 5. Data element 7 was changed after third change bucket counter 330b had increased to 9.

To maintain coherency in the data set, replicas 310–330 will synchronize with each other. Synchronization may be performed at regular intervals or may be initiated by a command from a user. During synchronization, changes present at one replica and not present at another replica are replicated such that replicas are synchronized. For example, changes present at first replica 310 and not present at second replica 320 may be replicated at second replica 320 and, simultaneously, changes present at second replica 320 and not present at first replica 310 may be replicated at first replica 310. To identify changes to be replicated, each replica 310–330 maintains a replication state vector 310c–330c, respectively. The replication state vector 310c–330c is an array of change buckets each corresponding to a replica 310–330 in group 300. Each such change bucket includes the replica identifier 310d–330d of its corresponding replica 310–330 and the count of the change bucket assigned to the highest change replicated from its corresponding replica. Replication state vectors 310c–330c are used to identify changes to be replicated as set forth below with reference to FIG. 4.

A flowchart of an exemplary method for synchronization in accordance with the present invention is shown in FIG. 4. As should be appreciated, although the flowchart of FIG. 4 is described in terms of replicating at first replica 310 changes present at second replica 320, the method of FIG. 4 may be by used to replicate at any replica changes present at any other replica. Specifically, to complete a synchronization between first replica 310 and second replica 320, changes present at first replica 310 are simultaneously replicated at second replica 320 by switching the roles of first replica 310 and second replica 320 in the method of FIG. 4.

At step 410, second replica 320 receives first replication state vector 310c maintained by first replica 310. First replication state vector 310c includes a first change bucket identifying the most recent change made at first replica 310, a second change bucket identifying the most recent change replicated at first replica 310 from second replica 320, and a third change bucket identifying the most recent change replicated at first replica 310 from third replica 330. For example, if first data set 310a includes the data elements shown in Table 1, then first replication state vector 310c is: {(R1,7), (R2,0), (R3,0)}. The second and third change buckets in first replication state vector 310c each have a count of "0" because no changes made at second replica 320 or third replica 330 have been replicated at first replica 310.

At step 412, second replica 320 compares first replication state vector 310c with second replication state vector 320c to determine a set of change buckets to be replicated. Second replication state vector 320c includes a first change bucket identifying the most recent change replicated at second replica 320 from first replica 310, a second change bucket identifying the most recent change made at second replica 320, and a third change bucket identifying the most recent change replicated at second replica 320 from third replica 330. For example, if second data set 320a includes the data elements shown in Table 2, then second replication state vector 320c is: {(R1,0), (R2,11), (R3,0)}. The first and third change buckets in second replication state vector 320c each have a count of "0" because no changes made at first replica 310 or third replica 330 have been replicated at second replica 320.

The set of change buckets to be replicated includes change buckets that are present at second replica 320 and not present at first replica 310. Such change buckets are identified by changes buckets in second replication state vector 320c that have a count that is greater than the count of the corresponding change bucket in first replication state vector 310c. For example, if first replication state vector 310c is {(R1,7), (R2,0), (R3,0)} and second replication state vector 320c is {(R1,0), (R2,11), (R3,0)}, then the set of change buckets to be replicated is: {(R2,0) through (R2,11)}.

At step 414, second replica 320 identifies changes to be replicated. Such changes each have a change bucket in the set of change buckets determined at step 412 above. Data Elements 3–5 in Table 2 each have a change bucket that is included in such a set.

At step 416, second replica 320 sends the changes identified at step 414, along with their corresponding change buckets, to first replica 310. At step 418, first replica 310 receives the changes and their corresponding change buckets, and, at step 420, replicates the changes and their corresponding change buckets at data set 310a. For example, data elements 3–5 in Table 2 may be replicated at first data set 310a. The replication of changes may be performed in serial or in parallel depending on the data transfer capabilities of the actual replicas used. The present invention supports both serial and parallel data transfer.

At step 422, second replica 320 sends second replication state vector 320c to first replica 310, and, at step 424, first replica 310 receives second replication state vector 320c. At step 426, first replica 310 joins first and second replication state vectors 310c and 320c to reflect that first replica 310 has replicated changes from second replica 320. For example, first replication state vector 310c may become: {(R1,7), (R2,11), (R3,0)}. The replication state vectors may be joined by a logical union.

To replicate at second replica 320 changes made at first replica 310, the method shown in FIG. 4 may be simultaneously performed with the roles of replicas 310 and 320 reversed whereby second replica 320 will receive changes from first replica 310. A complete synchronization occurs once changes made at first replica 310 are replicated at second replica 320 and changes made at second replica 320 are replicated at first replica 310. After a complete synchronization, the replication state vectors of the synchronizing replicas will be identical to reflect that the replicas are synchronized. For example, second replication state vector 310c will become: {(R1,7), (R2,11), (R3,0)}.

An exemplary first data set 310a after a "first" synchronization is shown below in Table 4:

TABLE 4

| Data Element ID | Change Bucket |
|---|---|
| 1 | (R1, 3) |
| 2 | (R1, 7) |
| 3 | (R2, 10) |
| 4 | (R2, 10) |
| 5 | (R2, 11) |

As shown, Data Elements 1–2, which are identical to Data Elements 1–2 in Table 1, were changed locally at first replica 310 prior to the first synchronization. At the first synchronization, Data Elements 3–5, which are the replications of changes to Data Elements 3–5 in Table 2, were replicated from second replica 320.

An exemplary second data set 320a after the first synchronization is shown below in Table 5:

TABLE 5

| Data Element ID | Change Bucket |
|---|---|
| 3 | (R2, 10) |
| 4 | (R2, 10) |
| 5 | (R2, 11) |
| 1 | (R1, 3) |
| 2 | (R1, 7) |

As shown, changes to Data Elements 3–5, which are identical to Data Elements 3–5 in Table 2, were made locally as second replica 320 prior to the first synchronization. At the first synchronization, Data Elements 1–2, which are the replications of changes to Data Elements 1–2 in Table 1, were replicated from first replica 310.

In addition to performing a synchronization between first replica 310 and second replica 320, the exemplary method set forth above with reference to FIG. 4 may be used to perform a synchronization involving third replica 330. For example, in a "second" synchronization, second replica 320 may synchronize with third replica 330. As should be appreciated, in such a second synchronization, although third replica 330 is not directly synchronizing with first replica 310, third replica 330 may indirectly replicate changes made at first replica 310. Such an indirect replication of changes occurs because changes made at first replica 310 were replicated at second replica 320 in the first synchronization. Thus, after such a second synchronization, second and third replication state vectors will both be {(R1,7), (R2,11), (R3,9)}.

An exemplary second data set 320a after the second synchronization is shown below in Table 6:

TABLE 6

| Data Element ID | Change Bucket |
|---|---|
| 3 | (R2, 10) |
| 4 | (R2, 10) |
| 5 | (R2, 11) |
| 1 | (R1, 3) |
| 2 | (R1, 7) |

TABLE 6-continued

| Data Element ID | Change Bucket |
|---|---|
| 6 | (R3, 5) |
| 7 | (R3, 9) |

As shown, changes to Data Elements 3–5, which are identical to Data Elements 3–5 in Table 2, were made locally at second replica 320 prior to the first synchronization. At the first synchronization, Data Elements 1–2, which are the replications of changes to Data Elements 1–2 in Table 1, were replicated from first replica 310. At the second synchronization, Data Elements 6–7, which are the replications of changes to Data Elements 6–7 in Table 3, were replicated form third replica 330.

An exemplary third data set 330a after the second synchronization is shown below in Table 7:

TABLE 7

| Data Element ID | Change Bucket |
|---|---|
| 6 | (R3, 5) |
| 7 | (R3, 9) |
| 1 | (R1, 3) |
| 2 | (R1, 7) |
| 3 | (R2, 10) |
| 4 | (R2, 10) |
| 5 | (R2, 11) |

As shown, changes to Data Elements 6–7, which are identical to Data Elements 6–7 in Table 3, were made locally at third replica 330 prior to the first synchronization. At the first synchronization, changes to Data Elements 1–2, were replicated at second replica 320 from first replica 310. At the second synchronization, changes to Data Elements 1–5 were replicated at third replica 330 from second replica 320.

Therefore, the exemplary method set forth above with reference to FIG. 4 enables replicas 310–330 to efficiently synchronize. During synchronization, the replicas exchange and compare replication state vectors to identify changes to be replicated. Once such changes are identified, they and their corresponding change buckets are sent for replication. Once changes are replicated, the replicas join their replication state vectors to reflect that they are synchronized.

The exemplary method of FIG. 4 provides for both single-master and multi-master replication. In single-master replication, data elements may be changed only at a single "master" replica, while, in multi-master data replication, data elements may be changed at multiple and possibly all replicas. As should be appreciated, although the flowchart of FIG. 4 is described in terms of replicating data from first replica 310 to second replica 320, the method of FIG. 4 may be by used to replicate at any replica a change made at any other replica.

Furthermore, the exemplary method of FIG. 4 provides for replication in either a fixed synchronization topology or a dynamic synchronization topology. In a fixed synchronization topology, a particular replica will only synchronize with a fixed set of other replicas, while in a dynamic synchronization topology, preferably all replicas will synchronize dynamically with every other replica. As should be appreciated, the method of FIG. 4 may enable second replica 320, or desirably any other replica, to identify and replicate changes made at any replica.

Thus, systems and methods for efficient multi-master replication in a dynamic synchronization topology supporting highly concurrent updates are disclosed. Each replica in a group of replicas of a data set is assigned a unique identifier and maintains an independent counter. When a change is made to an element in the data set, a change bucket, is assigned to the changed data element. The change bucket includes the identifier of the replica at which the change was made and the count of the counter of the replica at which the change was made at the time of the change. Each replica also maintains an array of change buckets each corresponding to the most recent changes replicated from the other replicas in the group. When replicas synchronize, the replicas exchange and compare the array of change buckets to identify changes present at a replica and not present at another replica. Once such changes are identified, they and their corresponding change buckets are sent to the other replica to be replicated. Once changes are replicated, the replicas join their replication state vectors to reflect that they are synchronized.

While the present invention has been described in connection with the preferred embodiments of the various figures, it is to be understood that other similar embodiments may be used or modifications and additions may be made to the described embodiment for performing the same function of the present invention without deviating therefrom. For example, while the present invention is described is described in terms of a group of replicas including three replicas, a group of replicas in accordance with the present invention may include any number of replicas. Furthermore, while the present invention is described is described in terms of replicating data from first replica 310 to second replica 320, the present invention may be by used to replicate data from any replica to any other replica. Therefore, the present invention should not be limited to any single embodiment, but rather should be construed in breadth and scope in accordance with the appended claims.

We claim:

1. A method for synchronizing a first replica of a data set and a second replica of the data set, each of the first and second replicas having an associated identifier and counter whereby, for each change made to an element in the data set, a change bucket is assigned to the element, the change bucket including an associated identifier and a count of an associated counter at the time of the change, the method comprising:

receiving at the second replica a first replication state vector maintained at the first replica, the first replication state vector including a first change bucket corresponding to a most recent change made at the first replica and a second change bucket corresponding to a most recent change replicated at the first replica from the second replica;

comparing at the second replica the first replication state vector and a second replication state vector maintained at the second replica, the second replication state vector including a first change bucket corresponding to a most recent change replicated at the second replica from the first replica and a second change bucket corresponding to a most recent change made at the second replica;

identifying changes to be replicated at the first replica, the changes to be replicated at the first replica each having a change bucket with the identifier of the second replica and a count greater than the count of the second change bucket of the first replication state vector and less than or equal to the count of the second change bucket of the second replication state vector; and sending to the first replica the changes to be replicated at the first replica and their corresponding change buckets.

2. The method of claim 1, wherein a change is one of a modification, an insertion, and a deletion of an element.

3. The method of claim 1, further comprising:

receiving at the first replica the second replication state vector; and assigning the second change bucket of the second replication state vector to the second change bucket of the first replication state vector.

4. The method of claim 1, further comprising:

receiving at the first replica the second replication state vector;

comparing at the first replica the first replication state vector and the second replication state vector;

identifying changes to be replicated at the second replica, the changes to be replicated at the second replica each having a change bucket with the identifier of the first replica and a count greater than the count of the first change bucket of the second replication state vector and less than or equal to the count of the first change bucket of the first replication state vector; and sending to the second replica the changes to be replicated at the second replica and their corresponding change buckets.

5. The method of claim 4, further comprising:

receiving at the second replica the changes to be replicated at the second replica and their corresponding change buckets; and replicating the changes to be replicated at the second replica.

6. The method of claim 5, further comprising assigning the first change bucket of the first replication state vector to the first change bucket of the second replication state vector.

7. A computer readable medium for synchronizing a first replica of a data set and a second replica of the data set, each of the first and second replica having an associated identifier and counter whereby, for each change made to an element in the data set, a change bucket is assigned to the element, the change bucket including an associated identifier and a count of an associated counter at the time of the change, the computer readable medium comprising computer executable instructions for performing the following steps:

receiving at the second replica a first replication state vector maintained at the first replica, the first replication state vector including a first change bucket corresponding to a most recent change made at the first replica and a second change bucket corresponding to a most recent change replicated at the first replica from the second replica;

comparing at the second replica the first replication state vector and a second replication state vector maintained at the second replica, the second replication state vector including a first change bucket corresponding to a most recent change replicated at the second replica from the first replica and a second change bucket corresponding to a most recent change made at the second replica;

identifying changes to be replicated at the first replica, the changes to be replicated at the first replica each having a change bucket with the identifier of the second replica and a count greater than the count of the second change bucket of the first replication state vector and less than or equal to the count of the second change bucket of the second replication state vector; and sending to the first replica the new changes made at the second replica and their corresponding change buckets.

8. The computer readable medium of claim 7, wherein a change is a one of a modification, an insertion, and a deletion of an element.

9. The computer readable medium of claim 7, further comprising computer executable instructions for performing the following steps:

receiving at the first replica the second replication state vector; and assigning the second change bucket of the second replication state vector to the second change bucket of the first replication state vector.

10. The computer readable medium of claim 7, further comprising computer executable instructions for performing the following steps:

receiving at the first replica the second replication state vector; and comparing at the first replica the first replication state vector and the second replication state vector;

identifying changes to be replicated at the second replica, the changes to be replicated at the second replica each having a change bucket with the identifier of the first replica and a count greater than the count of the first change bucket of the second replication state vector and less than or equal to the count of the first change bucket of the first replication state vector; and sending to the second replica the new changes made at the first replica and their corresponding change buckets.

11. The computer readable medium of claim 10, further comprising computer executable instructions for performing the steps of:

receiving at the second replica the changes to be replicated at the second replica and their corresponding change buckets; and replicating the changes to be replicated at the second replica.

12. The computer readable medium of claim 11, further comprising computer executable instructions for assigning the first change bucket of the first replication state vector to the first change bucket of the second replication state vector.

13. A system for data replication, comprising:

a first computing device comprising a memory for storing a first replica of a data set, a first identifier, and a first counter whereby, for each change made to an element in the data set at the first replica a change bucket is assigned to the element, the change bucket including the first identifier and a count of the first counter at the time of the change;

a second computing device comprising a memory for storing a second replica of a data set, a second identifier, and a second counter whereby, for each change made to an element in the data set at the second replica a change bucket is assigned to the element, the change bucket including the second identifier and a count of the second counter at the time of the change;

a first replication state vector maintained at the first computing device, the first replication state vector including a first change bucket corresponding to a most recent change made at the first replica and a second change bucket corresponding to a most recent change replicated at the first replica from the second replica;

a second replication state vector maintained at the second computing device, the second replication state vector including a first change bucket corresponding to a most recent change replicated at the second replica from the first replica and a second change bucket corresponding to a most recent change made at the second replica;

the first computing device performing the following steps:

receiving the second replication state vector;

comparing the first replication state vector and the second replication state vector;

identifying changes to be replicated at the second replica, the changes to be replicated at the second replica each having a change bucket including the identifier of the first replica and a count greater than the count of the first change bucket of the second replication state vector; and sending to the second computing device the changes to be replicated at the second replica and their corresponding change buckets; and the second computing device performing the following steps:

receiving changes to be replicated at the second replica; and replicating the changes to be replicated at the second replica.

14. The system of claim 13, wherein the data set is a relational data table.

15. The system of claim 13, wherein the first counter and the second counter are independently maintained.

16. The system of claim 13, wherein a change is one of a modification, an insertion, and a deletion of an element.

17. The system of claim of claim 13, wherein the first computing device further performs the following steps:

receiving changes to be replicated at the first replica, the changes to be replicated at the first replica each having a change bucket including the identifier of the second replica and a count greater than the count of the second change bucket of the first replication state vector; and replicating the changes to be replicated at the first replica.

18. The system of claim 17, wherein the first computing device further performs the step of assigning the second change bucket of the second replication state vector to the second change bucket of the first replication state vector.

19. The system of claim 13, wherein the second computing device further performs the following steps:

receiving the first replication state vector;

comparing the first replication state vector and the second replication state vector;

identifying changes to be replicated at the first replica, the changes to be replicated at the first replica each having a change bucket including the identifier of the second replica and a count greater than the count of the second change bucket of the first replication state vector; and sending to the first computing device the changes to be replicated at the first replica and their corresponding change buckets.

20. The system of claim 13, wherein the second computing device further performs the step of assigning the first change bucket of the first replication state vector to the first change bucket of the second replication state vector.

* * * * *